US007856259B2

(12) United States Patent
Bergh

(10) Patent No.: US 7,856,259 B2
(45) Date of Patent: Dec. 21, 2010

(54) IN-BUILT FM ANTENNA

(75) Inventor: Jonas Bergh, Kavlinge (SE)

(73) Assignee: Sony Ericsson Mobile Communications AB, Lund (SE)

( * ) Notice: Subject to any disclaimer, the term of this patent is extended or adjusted under 35 U.S.C. 154(b) by 533 days.

(21) Appl. No.: 11/846,542

(22) Filed: Aug. 29, 2007

(65) Prior Publication Data

US 2009/0061965 A1 Mar. 5, 2009

(51) Int. Cl.
*H04M 1/00* (2006.01)

(52) U.S. Cl. .................. 455/575.5; 455/128; 455/90.3; 455/347; 455/300; 455/301; 343/702; 343/872; 343/873; 343/841; 379/419; 361/752

(58) Field of Classification Search ............. 455/575.5, 455/300, 301, 90.3, 128, 347; 343/841, 702, 343/872, 873; 379/419; 361/752
See application file for complete search history.

(56) References Cited

U.S. PATENT DOCUMENTS

| | | | | |
|---|---|---|---|---|
| 4,225,970 A * | 9/1980 | Jaramillo et al. | ........... | 455/90.3 |
| 5,821,903 A * | 10/1998 | Williams | .................... | 343/702 |
| 6,771,939 B1 * | 8/2004 | Barnett et al. | .............. | 455/90.3 |
| 6,836,251 B2 * | 12/2004 | Reichelt | .............. | 343/700 MS |
| 6,909,911 B2 * | 6/2005 | Boyle et al. | .............. | 455/575.5 |
| 7,383,029 B2 * | 6/2008 | Sasaki et al. | ................ | 455/128 |
| 7,391,378 B2 * | 6/2008 | Mikkola et al. | ............. | 343/702 |
| 2006/0135090 A1 * | 6/2006 | Annamaa | ..................... | 455/95 |

FOREIGN PATENT DOCUMENTS

| | | | |
|---|---|---|---|
| EP | 1 294 046 | A2 | 3/2003 |
| EP | 1 306 922 | A2 | 5/2003 |
| EP | 1 439 603 | A1 | 7/2004 |
| EP | 1 689 021 | A1 | 8/2006 |
| WO | WO 99/27607 | A2 | 6/1999 |
| WO | WO 01/91233 | A1 | 11/2001 |
| WO | WO 02/37600 | A1 | 5/2002 |
| WO | WO 2004/109848 | A1 | 12/2004 |

OTHER PUBLICATIONS

Notification of Transmittal of the International Search Report and the Written Opinion of the International Searching Authority, or the Declaration corresponding to PCT/EP2008/052381, mailed May 21, 2008, 12 pages.

* cited by examiner

*Primary Examiner*—Matthew D Anderson
*Assistant Examiner*—April G Gonzales
(74) *Attorney, Agent, or Firm*—Harrity & Harrity, LLP

(57) ABSTRACT

A portable communication device including a casing having a front section and a back section is provided. The back section may at least partly made of an electrically conducting material. The casing also may enclose a ground plane and a radio circuit that is connected to a radiation receiving antenna element and the ground plane. The radiation receiving antenna element is provided in an area of electrically conducting material of the back section of the casing.

14 Claims, 2 Drawing Sheets

IN-BUILT FM ANTENNA

TECHNICAL FIELD OF THE INVENTION

The present invention relates to the field of antennas and, more particularly, to a portable communication device including an antenna.

DESCRIPTION OF RELATED ART

Cellular phones are today provided with more and more functionality, such as MP3 players and still and video camera capabilities.

At the same time, the phones are manufactured increasingly smaller. There are therefore continuing efforts made by the phone manufacturers to place devices providing this functionality in a very limited space in the interior of the device.

One function that has evolved recently is the reception of radio broadcasts, and then preferably FM radio broadcasts. The phone then includes a radio receiver, which can be combined with the normal wireless network communication circuits of the phone. The problem that remains to be solved is then that of the antenna.

Standard in-built phone antennas used in other areas are normally quarter or half-wavelength antennas. However, such antennas have too big dimensions for being used as internal FM radio antennas.

This has led to the practice of using an accessory, such as a hands free set including an ear phone connected to the system connector of the phone via a long cord. This cord then functions as antenna. This is a good solution in many cases. However a user may not always have this accessory at hand and in that case the user cannot listen to the radio.

For that reason and other reasons, like for instance removal of the need for extra devices and the provision of a more aesthetic appearance, there have been suggested FM antenna solutions that are provided inside the phone.

Known FM antennas that have been provided inside cellular phones include a meander antenna, which is described in EP-1294046, two parallel conductors, which is described in WO-2004/0191233 and a loop antenna element, which is described in EP-1689021.

However there is still room for improvement when providing antennas in cellular phones and similar portable communication devices.

There is thus a need for an improved inbuilt FM antenna solution and especially one that is less sensitive to changes in the surrounding area.

SUMMARY OF THE INVENTION

A first aspect of the present invention is directed to a portable communication device that may include a casing having a front section and a back section, where the back section is at least partly made of an electrically conducting material. The casing may enclose a ground plane, and a radio circuit connected to a radiation receiving antenna element and the ground plane, where the radiation receiving antenna element is provided in an area of electrically conducting material of the back section of the casing.

A second aspect of the present invention is directed to a portable communication device including the features of the first aspect, further comprising a matching network between the radio circuit and the radiation receiving antenna element.

A third aspect of the present invention is directed to a portable communication device including the features of the second aspect, wherein the matching network is arranged to tune the antenna to a radio station broadcast frequency range.

A fourth aspect of the present invention is directed to a portable communication device including the features of the third aspect, wherein the frequency range is the range of 88 to 108 MHz.

A fifth aspect of the present invention is directed to a portable communication device including the features of the second aspect, wherein the matching network consists of fixed components.

A sixth aspect of the present invention is directed to a portable communication device including the features of the second aspect, wherein the matching network includes at least one variable component.

A seventh aspect of the present invention is directed to a portable communication device including the features of the first aspect, wherein the front section includes electrically conducting material and the back section is electrically insulated from the front section.

An eighth aspect of the present invention is directed to a portable communication device including the features of the first aspect, wherein the back section is electrically floating.

A ninth aspect of the present invention is directed to a portable communication device including the features of the first aspect, wherein the back section is also connected to ground.

A tenth aspect of the present invention is directed to a portable communication device including the features of the ninth aspect, wherein the connection point to ground of the back section is separated from the antinodes of the radiation receiving antenna element, which antinodes are associated with the resonance frequency of the element.

An eleventh aspect of the present invention is directed to a portable communication device including the features of the ninth aspect, wherein the connection point to ground of the back section is provided at a point that corresponds to a node of the radiation receiving antenna element, which node is associated with the resonance frequency of the element.

A twelfth aspect of the present invention is directed to a portable communication device including the features of the first aspect, in which it is a cellular phone.

The invention has at least the following advantages. It is provided without the use of any additional elements, which saves space within the device. The radiation receiving antenna element is furthermore provided as far as possible above the ground plane, which makes the antenna perform better. It furthermore allows the listening to radio without needing a hands-free unit. The antenna is also fairly insensitive to being touched by a user. Such touching does not in any major way influence the quality of the antenna.

The expression antinode is intended to cover a point of maximum amplitude of the surface current of a radiation receiving antenna element.

It should be emphasized that the terms, “comprises/comprising” and/or “includes/including,” when used in this specification is taken to specify the presence of stated features, integers, steps or components, but does not preclude the presence or addition of one or more other features, integers, steps, components or groups thereof.

BRIEF DESCRIPTION OF DRAWINGS

The present invention will now be described in more detail in relation to the enclosed drawings, in which.

DETAILED DESCRIPTION

A portable communication device according to the invention will now be described in relation to a cellular phone, which is a preferred variation of the invention. The portable communication device can be based on another type of device though, like a cordless phone, a PDA or any other type of portable device communicating with radio waves.

Figure 1:
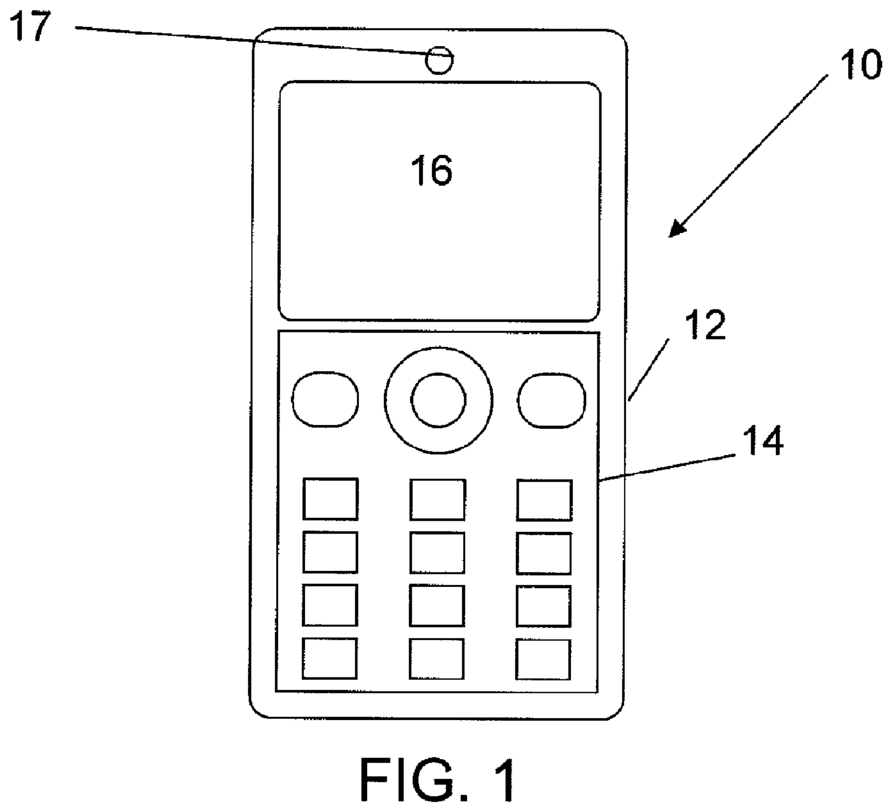
FIG. 1 schematically shows a front view of a cellular phone according to the invention.

FIG. 1 schematically shows a front view of a cellular phone 10. The phone 10 includes a keypad 14, a display 16 and a speaker 17, which all provide user interfaces via a casing 12 of the phone 10. The casing 12 then typically includes a window, below which the display 16 is provided and openings through which the keys of a keypad 14 may protrude and through which sound from the speaker 17 may be emitted. In the figure, the keypad 14 can be seen as provided in a bottom part of the casing 12, while the display 16 and speaker 17 are provided in an upper part. Here the display 16 is provided above keypad 14 and the speaker 17 is provided above the display 16. Here the speaker 17 is provided at an upper end of the casing 12. The casing 12 is, according to the present invention, at least partly made up of an electrically conducting material like a metal, which may be aluminum. Such a casing 12 may be provided for various design reasons, like aesthetic reasons. However, such a casing can therefore also be put to further use along the principles of the present invention, which will be elaborated on further below.

Figure 2:
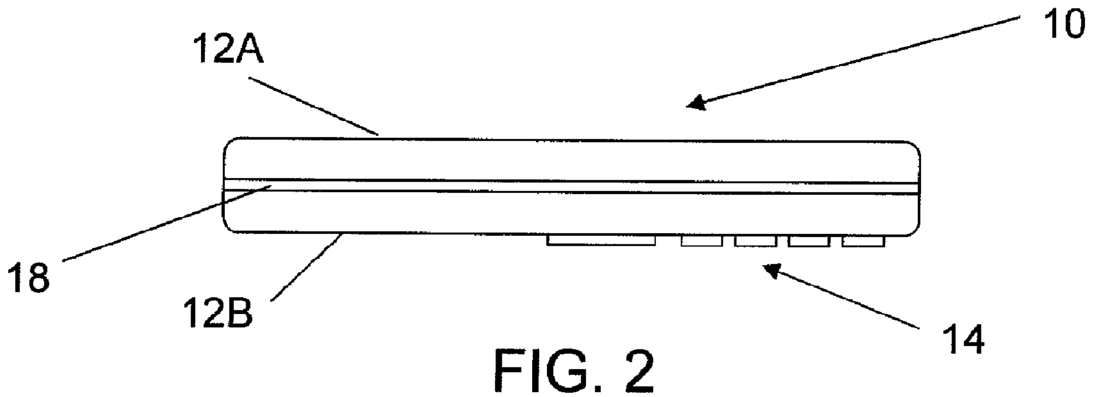
FIG. 2 schematically shows a side view of one variation of the cellular phone in FIG. 1.

FIG. 2 shows a side view of the phone in FIG. 1. In FIG. 2, the casing is made up of a number of sections that are joined together and cover the various elements of the phone. In FIG. 2 there are only two such sections a back section or back half 12A and a front section or front half 12B. Here the front half 12B includes the above mentioned display window (not shown) and the keypad 14. The front half is for this reason intended to face a user, i.e. to be placed against the head of a user when the phone is being used in for instance making and receiving phone calls. Thus normally the upper part is directed upwards into the air while the bottom part is facing downward to the ground if the phone 10 is used by a user standing up. For the same reason the back half is intended to face away from the user. According to the variation of the invention depicted in FIG. 2, both the front and back halves 12B and 12A are wholly made of a metal, like aluminum. According to this variation, the back half 12A is electrically insulated from the front half 12B, through the use of an electrically insulating material 18. This material does in this variation encircle the whole phone and is provided between the whole interface between the front and back halves 12B and 12A. The insulating material 18 can be provided through any suitable insulating material, for instance rubber or a plastics material. The use of rubber has the further advantage that it may provide sealing of the casing. It should here be realized that the amount of insulation material provided between the two halves 12A and 12B is dependent on how much of each half that is provided as metal. According to the present invention, an area of electrically conducting material of the back half 12A is used for providing an antenna. It is therefore only this area of the back half 12A that needs to be insulated from any electrically conducting material provided in the front half 12B. Thus, this electrical insulation need only be provided round the whole of the phone in case both parts are wholly made of electrically conducting material.

In some variations of the present invention the front half need not be made of metal at all, but can for instance be made of some plastics material. In this case the insulating material may be omitted. Thus it is sufficient that only the back half 12A of the casing is at least partly made up of electrically conducting material. It is furthermore possible that metal parts of the front half 12B may be grounded. The reason for the above mentioned insulation is that if the front half is instead used for an antenna, there may be near-field losses to the head of the user, which will unnecessary waste energy in this direction. As portable communication devices are battery powered it is important to limit the waste of energy.

Figure 3:
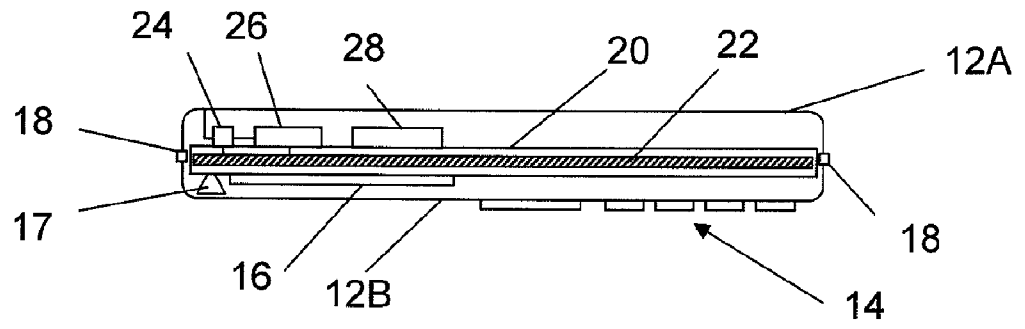
FIG. 3 schematically shows a side view of the interior of a phone according to a first embodiment of the present invention and comprising a circuit board inside the casing on which elements relating to the present invention are placed.

In FIG. 3 there is shown a side view of the phone according to a first embodiment of the present invention and some of the elements that are placed inside the casing 12A and 12B. The casing 12A and 12B encloses a circuit board 20 on which some elements are placed. In FIG. 3 the electrical insulating material 18 separating the front half 12B from the back half 12A is shown as well as the keys 14 of the keypad protruding from the front half 12B. On one side of the circuit board 22, a front side that is intended to face the front half 12B of the casing, there is provided a display 16 and a speaker 17, while on the back side of the circuit board 20 there is provided a matching network 24 electrically connected to the back half 12B as well as to a radio circuit 26. On the back side of the circuit board there is furthermore provided a radio control unit 28. In the middle of the circuit board there is provided a ground plane 22 that here stretches throughout the whole of the circuit board 20. The matching network 24 and the radio circuit 26 are here connected to this ground plane 22. It should here be realized that the side of the circuit board 20 that the matching network 24, the radio circuit 26 and the radio control unit 28 are placed on is not crucial for the present invention, but that they could just as well be placed on the other side.

Here the whole of the back half 12A of the casing is of an electrically conducting material, that is here a metallic material, for instance aluminum, and the whole back half 12A is therefore used as a radiation receiving antenna element of an FM antenna. In this embodiment the back half 12A is floating in an electrical sense. It is thus not connected to ground or any other fixed electrical potential, but is connected only to the radio circuit 26 via the matching network 24. The connection point to the back half 12A may furthermore with advantage be provided as high up as possible in the upper part of the phone as close to the upper end as possible. This is thus in a position that may be aligned with the speaker 17 on the opposite side of the board 20.

Figure 4:
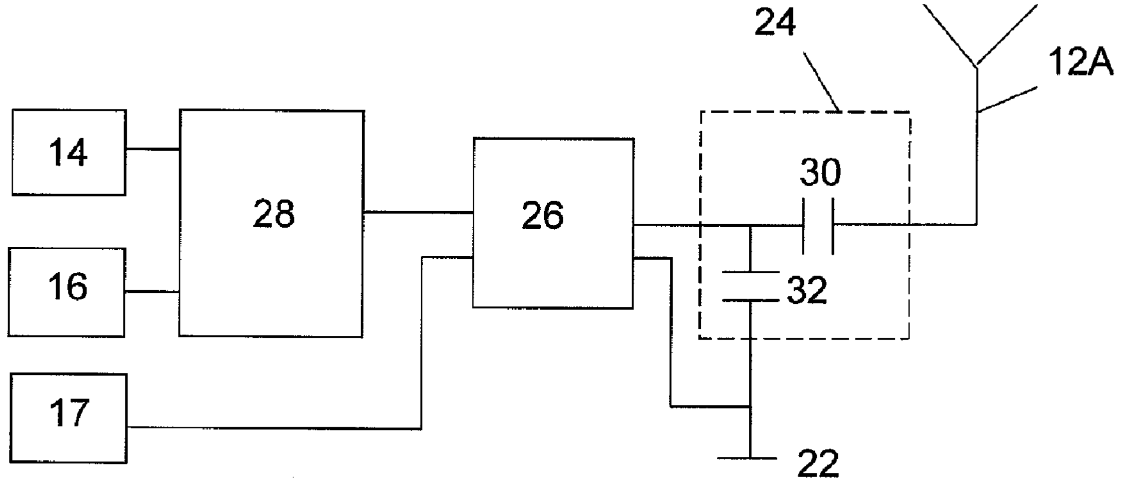
FIG. 4 shows a block schematic of the various elements of FIG. 3.

FIG. 4 shows a block schematic of one variation of the antenna solution according to the present invention that can be used in relation to the first embodiment. It also shows various circuits for driving the antenna. The radiation receiving antenna element 12A, i.e., the back half of the casing, is here connected to a first end of a first capacitor 30 of the matching network 24, while a second end of the first capacitor 30 is connected to a first end of a second capacitor 32 and to the radio circuit 26. A second end of the second capacitor 32 is here connected to ground 22 as is the radio circuit 26. The radio circuit 26 is furthermore connected to the radio control unit 28 and to the speaker 17. The radio control unit 28 is in turn connected to the keypad 14 and the display 16. The matching network 24 is in the shown embodiment a CC circuit that is implemented in the form of fixed capacitors that match the antenna to the FM frequency range of interest. A user may then select a radio frequency to tune in to via the keypad 14, where selections made and prompts regarding frequency selections may be displayed via the display 16. Software provided by the radio control unit 28 will then tune the radio circuit 26 to reception of the selected radio frequency. The received radio signals are then provided from the antenna to the radio circuit 26, which demodulates them and emits sound via the speaker 17.

As an alternative it should be realized that one or both of the capacitors may be variable and that matching may be suitably set through adjusting one or both of these capacitors. It should also be realized that the matching network may be provided with the use of inductors as well, either instead of or combined with capacitors. These inductors may also be fixed or variable.

The radio circuit 26 can be provided in an ASIC circuit which combines a number of functions like, for instance mobile, cellular radio communication functions as well as FM radio reception functions. When the ground plane 22 is large enough the invention therefore provides a dipole antenna, where the back half 12A of the casing is one of the radiation receiving elements of the antenna and the ground plane 22 is the other radiation receiving element. These are then fed by the radio circuit 26 via the matching network 24. If the ground plane 22 is smaller, the back half 12A of the casing can instead be considered as a monopole antenna.

In normal operation of the phone for receiving radio station signals, the antenna is set to a radio station broadcast frequency range or frequency band by the matching network. This matching network can also be set to be tuned to different transmission frequencies within the band. This network can be fixed to the FM band, which is 88-108 MHz, but it is also possible to let it be variable for instance by using a variable capacitance in the CC circuit for allowing other radio transmission frequencies. It is also possible to set the antenna for reception of the specific frequencies used by the radio stations. This can then also be done through influencing the matching network. There may here of course be amplification (not shown) of signals received via the antenna before being provided to the radio circuit.

Figure 5:
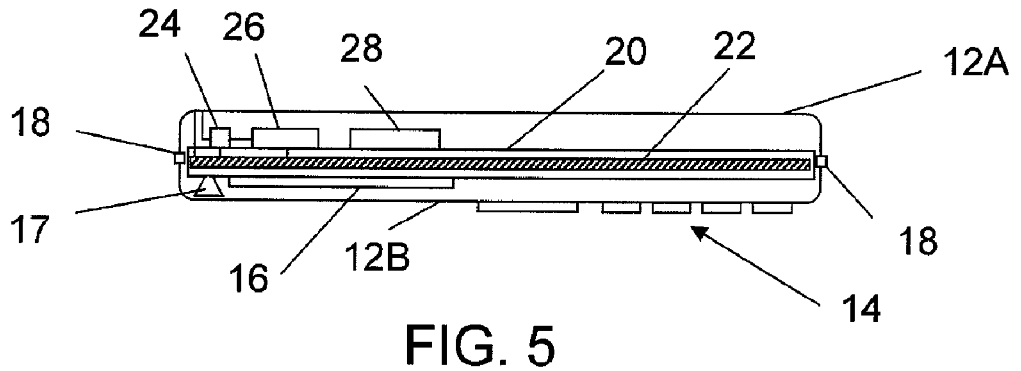
FIG. 5 schematically shows a side view of the interior of a phone according to a second embodiment of the present invention and comprising a circuit board inside the casing on which elements relating to the present invention are placed.

A second embodiment of the present invention is shown in FIG. 5. FIG. 5 shows the same phone and elements as in FIG. 3 and these elements will therefore not be described further. The difference from FIG. 3 is here that the back half 12A of the casing is also connected to ground 22. It thus has only two connections, one to the matching network 24 and one to ground 22. In this way the radiation receiving element made up by the back half 12A of the casing resembles a PIFA element. Also this connection to ground is preferably provided as high up as possible in the upper part of the phone. In order to make this antenna solution work it is important that the connection to ground is not provided at a position of the radiation receiving antenna element that is associated with or provides an antinode for the resonance frequency of the radiation receiving element. An antinode is here a point of maximum amplitude of the surface current of the radiation receiving antenna element. The connection to ground must thus be separated from such positions. It can thus be placed at any other position. The best performance will then normally be obtained in a node point associated with or for the resonance frequency of this element.

The antenna according to the present invention has a number of advantages. It is provided without the use of any additional elements, which saves space within the phone. The radiation receiving antenna element is furthermore provided as far as possible above the ground plane, which makes the antenna perform better. It furthermore allows the 5 listening to FM radio without needing a hands-free unit. The antenna is also fairly insensitive to being touched by a user. Such touching does not in any major way influence the quality of the antenna. By providing the connection points between the back half of the casing and the matching network as close to the top end of the phone as possible, it is possible to use as much as possible of the back half of the casing as a radiation receiving antenna element. This allows a reduction of the resonance frequency of this element, which in turn limits the requirements placed on the matching network. In this way the degradation of the bandwidth of the antenna that is caused by the matching network is limited.

The present invention can be varied in many ways apart for the ones that have been described earlier. The casing may for instance not be aluminum; it can be any other suitable electrically conducting material. There can furthermore be more casing sections than two and also more than one back section and more than one front section. The invention was furthermore described in relation to the FM band. It is possible also to apply the present invention to other radio frequency bands, like VHF. The radio circuit need not be provided on the same side of the circuit board as the antenna element. It can just as well be provided on the opposite side. In fact the radio circuit can be placed anywhere on the circuit board. The matching network is not limited to the matching network described. It can have more or fewer components and also for instance include one or more capacitors the capacitance of which can be varied or fixed. The matching network can apart from being a CC network also be an LC network or any suitable matching network. In some situations it may furthermore be possible to omit the matching network. The advantageous placing of the connection points to the radiation receiving antenna element are not limited to the upper end. The same advantages can be obtained if they are placed 30 in the opposite, bottom end. It should furthermore be realized that the invention can be provided without the use of the radio control unit.

The invention is therefore only to be limited by the accompanying claims.

What is claimed is:

1. A portable communication device comprising:

a casing including:

a front section including a first portion comprising electrically conducting material, a back section including a second portion comprising electrically conducting material, and an electrically insulating material provided between the first portion and the second portion;

whichever of the first portion or the second portion is smaller in area;

a ground plane enclosed in the casing; and a radio circuit enclosed in the casing and connected to a radiation receiving antenna element and the ground plane, wherein:

the radiation receiving antenna element is provided in an area of the electrically conducting material of the back section, an electrical connection point, between the ground plane and the back section, is separated from antinodes of the radiation receiving antenna element, and the antinodes are associated with a resonance frequency of the radiation receiving antenna element.

2. The portable communication device of claim 1, further comprising:

a matching network between the radio circuit and the radiation receiving antenna element.

3. The portable communication device of claim 2, wherein the matching network is configured to tune the radiation receiving antenna element to a radio station broadcast frequency range.

4. The portable communication device of claim 3, wherein the frequency range is the range of from about 88 to about 108 MHz.

5. The portable communication device of claim 2, wherein the matching network comprises fixed components.

6. The portable communication device of claim 2, wherein the matching network includes at least one variable component.

7. The portable communication device of claim 1, wherein the portable communication device is a cellular phone.

8. A portable communication device comprising:

a casing including:

a front section including a first portion comprising electrically conducting material, a back section including a second portion comprising electrically conducting material, and an electrically insulating material provided between the first portion and the second portion;

a ground plane enclosed in the casing; and a radio circuit enclosed in the casing and connected to a radiation receiving antenna element and the ground plane, wherein:

the radiation receiving antenna element is provided in an area of the electrically conducting material of the back section, an electrical connection point is provided, between the ground plane and the back section, at a point that corresponds to a node of the radiation receiving antenna element, and the node is associated with the resonance frequency of the radiation receiving antenna element.

9. The portable communication device of claim 8, further comprising:

a matching network between the radio circuit and the radiation receiving antenna element.

10. The portable communication device of claim 9, wherein the matching network is configured to tune the radiation receiving antenna element to a radio station broadcast frequency range.

11. The portable communication device of claim 10, wherein the frequency range is the range of from about 88 to about 108 MHz.

12. The portable communication device of claim 9, wherein the matching network comprises fixed components.

13. The portable communication device of claim 9, wherein the matching network includes at least one variable component.

14. The portable communication device of claim 8, wherein the portable communication device is a cellular phone.

* * * * *

UNITED STATES PATENT AND TRADEMARK OFFICE

CERTIFICATE OF CORRECTION

PATENT NO. : 7,856,259 B2
APPLICATION NO. : 11/846542
DATED : December 21, 2010
INVENTOR(S) : Jonas Bergh It is certified that error appears in the above-identified patent and that said Letters Patent is hereby corrected as shown below:

In Column 6, Claim 1, please delete the text from lines 56 and 57: "whichever of the first portion or the second portion is smaller in area;"

Signed and Sealed this
Tenth Day of May, 2011

David J. Kappos
*Director of the United States Patent and Trademark Office*